(12) United States Patent
Van Rest et al.

(10) Patent No.: US 10,614,126 B2
(45) Date of Patent: Apr. 7, 2020

(54) TEXTUAL QUERY EDITOR FOR GRAPH DATABASES THAT PERFORMS SEMANTIC ANALYSIS USING EXTRACTED INFORMATION

(71) Applicant: Oracle International Corporation, Redwood Shores, CA (US)

(72) Inventors: Oskar Van Rest, Mountain View, CA (US); Raghavan Raman, Sunnyvale, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 395 days.

(21) Appl. No.: 14/718,411

(22) Filed: May 21, 2015

(65) Prior Publication Data
US 2016/0342628 A1    Nov. 24, 2016

(51) Int. Cl.
*G06F 16/835* (2019.01)
*G06F 16/832* (2019.01)

(52) U.S. Cl.
CPC .......... *G06F 16/835* (2019.01); *G06F 16/832* (2019.01)

(58) Field of Classification Search
CPC ................... G06F 17/30929; G06F 17/30926
See application file for complete search history.

(56) References Cited

U.S. PATENT DOCUMENTS

| | | | |
|---|---|---|---|
| 5,805,863 A | 9/1998 | Chang | |
| 5,822,587 A | 10/1998 | McDonald | |
| 6,883,161 B1 | 4/2005 | Chovin et al. | |
| 6,922,830 B1 | 7/2005 | Schmidt | |
| 7,478,375 B1 | 1/2009 | Kersters | |
| 8,037,108 B1 * | 10/2011 | Chang | G06F 17/303 707/803 |

(Continued)

OTHER PUBLICATIONS

Dolby, "Automatic Inline Allocation of Objects", Proceedings of the ACM SIGPLAN Conference on Programming Language Design and Implementation, dated Jun. 1997, vol. 32, Issue 5, pp. 7-17.

(Continued)

*Primary Examiner* — Apu M Mofiz
*Assistant Examiner* — Husam Turki Samara
(74) *Attorney, Agent, or Firm* — Hickman Palermo Becker Bingham LLP

(57) ABSTRACT

Techniques herein are for query editing with semantic analysis of a query based on information extracted from a tuple graph. In an embodiment, a computerized method involves processing a dataset to extract an extracted schema that describes types and relationships that occur within the dataset. The dataset is not associated with a schema that is not contained in the dataset. The dataset has a graph of tuples. During an incremental parse, an abstract syntax tree (AST) that represents a query is modified. The extracted schema and the dataset are used to perform semantic analysis on the AST. In an embodiment, the tuples are resource description framework (RDF) triples. In an embodiment, the RDF triples include RDF schema statements. Extracting an extracted schema involves processing RDF schema statements. In an embodiment, the query is a SPARQL query and semantic analysis includes error alerting and code completion.

20 Claims, 6 Drawing Sheets

(56) References Cited

U.S. PATENT DOCUMENTS

| | | | |
|---|---|---|---|
| 8,910,134 B2 | 12/2014 | Hong et al. | |
| 8,949,811 B2 | 2/2015 | Murthy | |
| 2004/0128661 A1 | 7/2004 | Ghosh | |
| 2004/0133747 A1 | 7/2004 | Coldewey | |
| 2005/0278451 A1 | 12/2005 | Yamashita | |
| 2005/0289125 A1* | 12/2005 | Liu | G06F 17/30932 |
| 2007/0192306 A1* | 8/2007 | Papakonstantinou | G06F 17/30864 |
| 2010/0023700 A1 | 1/2010 | Chen | |
| 2010/0169758 A1* | 7/2010 | Thomsen | G06F 17/246 715/212 |
| 2011/0055819 A1 | 3/2011 | Doyle | |
| 2011/0099541 A1 | 4/2011 | Blomstedt | |
| 2011/0138369 A1 | 6/2011 | Chandra | |
| 2011/0239197 A1 | 9/2011 | Dayan | |
| 2011/0276962 A1 | 11/2011 | Chambers | |
| 2013/0031536 A1 | 1/2013 | De | |
| 2013/0097136 A1 | 4/2013 | Goldberg | |
| 2013/0139135 A1 | 5/2013 | Ditu | |
| 2014/0019949 A1 | 1/2014 | Craymer | |
| 2014/0189665 A1 | 7/2014 | Hong et al. | |
| 2014/0282384 A1* | 9/2014 | Pamer | G06F 8/437 717/113 |
| 2014/0306964 A1 | 10/2014 | Reddish | |
| 2014/0310619 A1 | 10/2014 | Fickenwirth | |
| 2014/0325666 A1* | 10/2014 | Gkoulalas-Divanis | G06F 17/30289 726/26 |
| 2015/0007154 A1 | 1/2015 | Bharadwaj | |
| 2015/0040110 A1 | 2/2015 | Adl-Tabatabai | |
| 2015/0052175 A1* | 2/2015 | Bornea | G06F 17/30292 707/798 |
| 2015/0067639 A1 | 3/2015 | Pizlo | |
| 2015/0178405 A1 | 6/2015 | Hong et al. | |
| 2015/0331683 A1 | 11/2015 | Sevenich et al. | |
| 2015/0350324 A1 | 12/2015 | Hu et al. | |
| 2015/0355891 A1 | 12/2015 | Angerer | |
| 2016/0019228 A1 | 1/2016 | Hong | |
| 2016/0026680 A1* | 1/2016 | Banerjee | G06F 17/30404 707/766 |
| 2016/0048607 A1 | 2/2016 | Raman | |
| 2016/0055184 A1* | 2/2016 | Fokoue-Nkoutche | G06F 16/2282 707/809 |
| 2016/0062776 A1 | 3/2016 | Stanfill | |
| 2016/0117358 A1 | 4/2016 | Schmid | |
| 2017/0024192 A1 | 1/2017 | Hong et al. | |

OTHER PUBLICATIONS

Sevenich, U.S. Appl. No. 14/805,897, filed Jul. 22, 2015, Office Action, dated Feb. 17, 2017.

Sevenich et al., "Using Domain-Specific Languages for Analytic Grpah Database", VLDB Endowment, dated Sep. 2016, pp. 1257-4268.

Schiller et al., "Efficient Data Structures for Dynamic Graph Analysis", IEEE, dated Nov. 2015, pp. 497-504.

Perez et al., "Ringo: Interactive Graph Analytics on Big-Memory Machines", ACM, SIGMOD, dated May 2015, 6 pages.

Hong et al., "Simplifying Scalable Graph Processing Wraith a Domain-Specific Language", ADM, CGO'14, pp. 208-218.

Hong et al., "Green-Marl: A DSL for Easy and Efficient Graph Analysis", dated 2012 ACM, ASPLOS'12, pp. 349-362.

Hong et al., "Early Experiences in Using a Domain-Specific Language for Large-Scale Graph Analysis", ACM, Grades, dated 2013, pp. 1-6.

Banerjee et al., "Towards Logical Level Design of Big Data", dated Jul. 2015, 7 pages.

Bak et al., "A Reference Interpreter for the Graph Programming Language GP 2", Proc. Graphs as Models (GaM 2015), vol. 181, dated Apr. 2015, 17 pages.

U.S. Appl. No. 14/805,882, filed Jul. 22, 2015, Office Action, dated Feb. 4, 2016.

U.S. Appl. No. 14/805,882, filed Jul. 22, 2015, Notice of Allowance, dated Sep. 28, 2016.

U.S. Appl. No. 14/805,882, filed Jul. 22, 2015, Notice of Allowance, dated May 19, 2016.

Sevenich, U.S. Appl. No. 14/805,897, filed Jul. 22, 2015, Interview Summary, dated Oct. 26, 2017.

Sevenich, U.S. Appl. No. 14/805,897, filed Jul. 22, 2015, Final Office Action, dated Sep. 14, 2017.

Moran, Brian, "Adding Columns to Large MySQL Tables Quickly", https://www.onehub.com/blog/2009/09/15/adding-columns-to-large-mysql-tables-quickly/, dated Sep. 15, 2009, 7 pages.

Sevenich, U.S. Appl. No. 14/805,897, filed Jul. 22, 2015, Notice of Allowance, dated Jun. 26, 2018.

Sevenich, U.S. Appl. No. 14/805,897, filed Jul. 22, 2015, Adviosry Action, dated Dec. 20, 2017.

* cited by examiner

US 10,614,126 B2

TEXTUAL QUERY EDITOR FOR GRAPH DATABASES THAT PERFORMS SEMANTIC ANALYSIS USING EXTRACTED INFORMATION

TECHNICAL FIELD

Embodiments relate generally to techniques for applying semantic analysis, within a textual query editor, of a query of a tuple graph. Semantic analysis may be based on the graph and a schema extracted from the graph.

BACKGROUND

Modern textual editors for general programming languages, such as Eclipse for Java, provide advanced features such as semantic content completion and semantic constraint checking, for the sake of user convenience and productivity. These convenience features are only available because the editor is tightly integrated with the compiler of the programming language. The compiler performs semantic analysis on a given user program and provides necessary information such as names and types of the variables to the editor.

For the case of a database query language, such as structured query language (SQL) or SPARQL, it is difficult for the editors to provide such features, because the required information is not present in the query being edited. With SQL this deficiency is lessened for a query on a relational database system, because the necessary information, such as column names and types of tables, is defined in a self-contained and standalone schema that exists as a first class object outside of the query and outside of a dataset being queried. However, graph databases and tuple databases do not have such a self-contained and standalone schema. This deficiency prevents exploitation of semantic analysis for graph and tuple databases based on traditional techniques.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Query Editor System
2.1 Semantic Analysis
3.0 Example Editor Process
4.0 Semantic Analysis With RDF Triplestore
4.1 Semantic Analysis With RDF Schema
4.2 Semantic Analysis With SPARQL
5.0 Hardware Overview
6.0 Extensions and Alternatives 1.0. General Overview Techniques are described herein for query editing with semantic analysis of a query based on information extracted from a tuple graph. In an embodiment, a computerized method involves processing a dataset to extract an extracted schema that describes types and relationships that occur within the dataset. The dataset is not associated with a schema that is not contained in the dataset. The dataset has a graph of tuples. During an incremental parse, an abstract syntax tree (AST) that represents a query is modified. The extracted schema and the dataset are used to perform semantic analysis on the AST.

In an embodiment, the tuples are resource description framework (RDF) triples comprising a subject, a predicate, and an object.

In an embodiment, the RDF triples include RDF schema statements. Extracting an extracted schema involves processing the RDF schema statements.

In an embodiment, the query is a SPARQL query.

In an embodiment, semantic analysis includes error alerting or code completion.

2.0 Example Query Editor System

Figure 1:
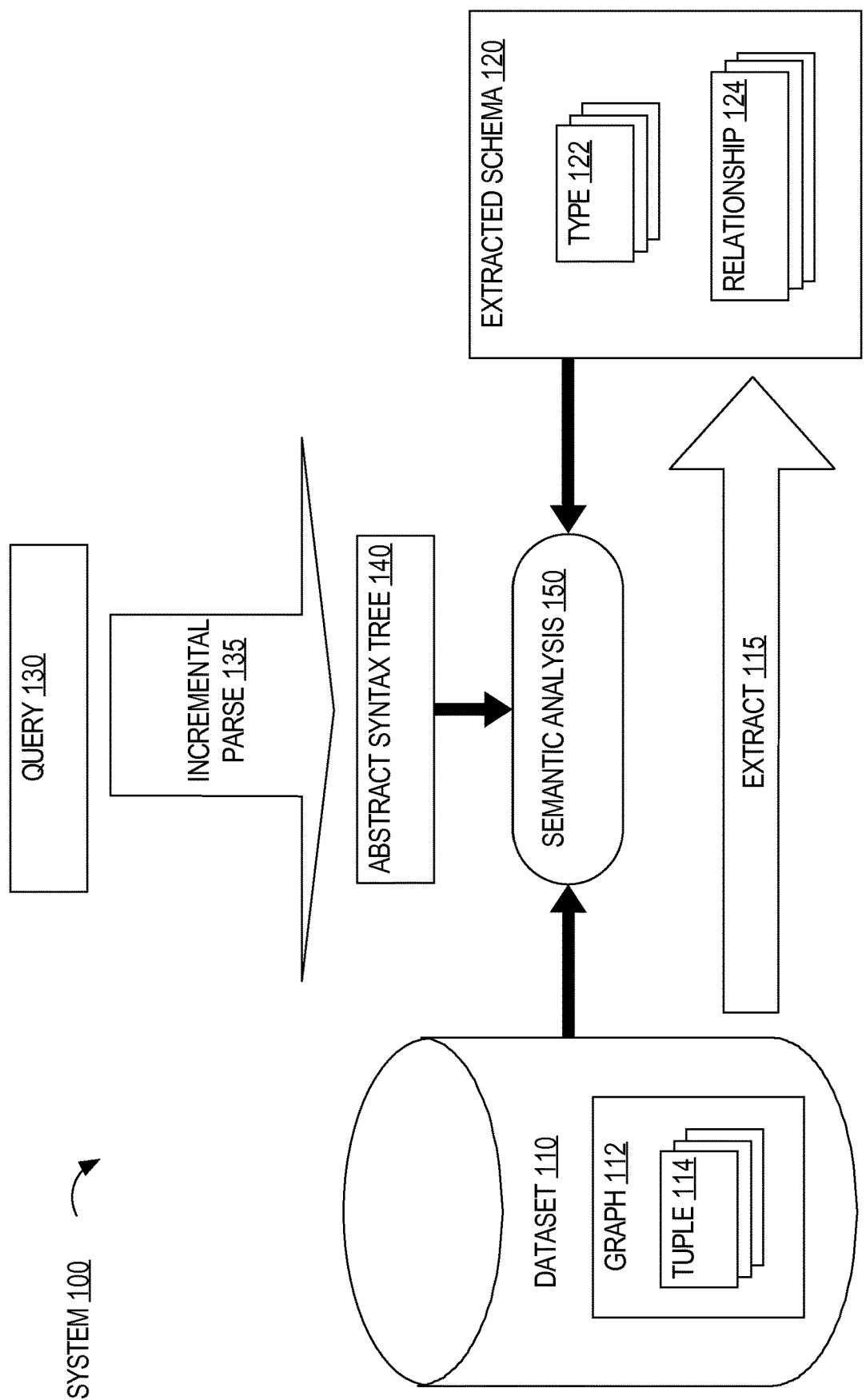
FIG. 1 is a logical block diagram illustrating an example query editor system in which certain techniques described herein may be implemented, according to various embodiments.

FIG. 1 illustrates a block diagram of example query editor system 100, in which techniques described herein may be practiced. Query editor system 100 has an interactive textual query editor. Query editor system 100 performs semantic analysis of a query using information extracted from a datasource, such as a graph database.

Query editor system 100 includes dataset 110. Dataset 110 is an organized collection of structured data. Dataset 110 may reside in a file, a filesystem, a database such as a graph database or a tabular database, or any other repository or datasource that offers structured data.

Dataset 110 includes graph 112. Graph 112 includes vertices interconnected by edges. The vertices and edges are encoded as tuples, such as tuple 114. A tuple is a collection of data values. The collection of data values may be unordered or ordered as a list. Each data value may be a primitive such as a literal, an identifier such as a reference, or a data structure such as another tuple. Tuples may be nested as values within another tuple.

A minimal tuple has a single value that represents a vertex of graph 112. An edge connects two vertices. An edge may be implied by a nesting of one tuple within another tuple, with each tuple specifying a vertex. An edge may be implied by a tuple that has two values, with each value specifying a vertex. A tuple having three values may explicitly describe an edge between two vertices. Graph 112 may be composed of other tuple configurations not mentioned.

Prior to editing, query editor system 100 performs extract 115 to obtain extracted schema 120 from dataset 110.

Extracted schema 120 describes the data types and relationship patterns of tuples within dataset 110. Extract 115 is necessary in the absence of a separate and self-contained schema, such as a relational database schema. A relational database has a schema whose specification is not comingled within a dataset that the schema describes. Whereas, query editor system 100 obtains extracted schema 120 even though a schema is absent or encoded as tuples within dataset 110. For example, tuple 114 may encode schema data or non-schema data. Although dataset 110 may reside in a relational database table that has a DDL schema, the DDL schema may be lacking some needed definitions. Hence, extract 115 may be necessary despite an available DDL schema.

Extracted schema 120 contains types, such as type 122, and specifies relationships amongst types and tuples, such as relationship 124. Types may be expressly declared within dataset 110, in which case they may be directly added to extracted schema 120. Other types exist only as recurring patterns within the data of dataset 110. Such types must be inferred by extract 115 before they may be added to extracted schema 120. For example, extract 115 may recognize that an attribute appears in various tuples of dataset 110 and that the attribute always has a numeric value. Extract 115 may recognize that some attributes always appear together, either within a tuple or in subgraphs of related tuples.

During editing, query 130 is entered or loaded into query editor system 100. Query 130 has text structured according to a grammar of some query language, such as SPARQL. Query 130 encodes an operation to perform on dataset 110, such as a search or an update. Each interactive change to the text of query 130 that is made during editing may cause query editor system 100 to perform incremental parse 135.

Incremental parse 135 produces abstract syntax tree (AST) 140. AST 140 is a tree of parse nodes. Each parse node corresponds to an independently meaningful fragment or clause of the text of query 130, such as a filter criterion or a compound filter of criteria. A tree is well suited to capture nestings of clauses within clauses, such as a compound filter clause that includes substituent filter criterion clauses.

Each parse node corresponds to a span of text. The root node of AST 140 corresponds to the whole text of query 130. Leaf nodes of AST 140 correspond to the smallest fragments, which may be individual lexemes. An intermediate node of AST 140 corresponds to a span of text that contains the spans of all nodes in a subtree rooted at the intermediate node. The identification of text spans is important for providing meaningful feedback to a user that indicates where within the text of query 130 an error appears.

Query editor system 100 may be used to make a series of interactive changes. Each interactive change may cause a repetition of incremental parse 135, which may entail repeated total regeneration of AST 140. Instead, a series of performances of incremental parse 135 may share an AST 140, with each incremental parse 135 changing AST 140 only as needed. For example, usually each interactive edit involves only a small portion of the text of query 130, such that corresponding invocations of incremental parse 135 need make only minimal changes to AST 140.

2.1 Semantic Analysis

After each interactive edit, query editor system 100 may provide feedback or guidance based on semantic analysis 150. Query editor system 100 may report that query 130 is invalid in its current form. Some kinds of query errors may be detected directly by incremental parse 135. For example, incremental parse 135 may detect and report a syntax or grammatical error. In other circumstances, query 130 may appear superficially valid, as when query 130 is syntactically well formed. However, being well formed does not guarantee that query 130 conforms to extracted schema 120 or is consistent with the contents of dataset 110. Detection of an error in the substance of query 130 requires semantic analysis 150.

Semantic analysis 150 attempts to reconcile query 130 with extracted schema 120 and dataset 110. For example, tuples of graph 112 may have uniform resource identifiers (URI) that reference other tuples or external resources. Query 130 may also use a URI. However, a URI may be properly formatted and yet be invalid, such as one that dangles and is not derenferenceable. If query 130 specifies a value that is absent from dataset 110, semantic analysis 150 may detect and alert such an error. Semantic analysis 150 may alert by listing an error in an error pane, marking the error in an editor margin, or decorating offending text of query 130 as erroneous.

Semantic analysis 150 may use extracted schema 120 to detect various kinds of semantic errors. Arguments of an operator within query 130 may have incompatible types, which often cannot be detected during semantic analysis 150 unless extracted schema 120 is consulted. The types and relationships within extracted schema 120 may impose topological constraints on graph 112, such as a requirement that two tuples of particular types be related or not related. Semantic analysis 150 may detect and alert that query 130 expresses a relational pattern that does not conform to extracted schema 120. If dataset 110 encodes tuples in a language such as resource description framework (RDF), then extracted schema 120 may be enriched with detailed relational and other semantic constraints for use by semantic analysis 150.

Incremental parse 135 may occur after each keystroke of an interactive edit. Such eager parsing enables query editor system 100 to observe transient states during interactive formation of query 130. Semantic analysis 150 may exploit such moments to determine which missing lexemes may be added to query 130 to help achieve validity. For example, semantic analysis 150 may determine that any of a limited and readily identifiable set of values would make query 130 valid. Query editor system 100 may offer these values as proposals from which a user may select one to be added to query 130. Query editor system 100 may offer proposals in a popup menu that appears at a place where text is being entered for query 130. This may boost productivity during editing, especially if dataset 110, extracted schema 120, or query 130 is complex.

Semantic analysis 150, extracted schema 120, and dataset 110 are complementary. For example, dataset 110 may contain demographic data of numerous people having red, blond, brown, and black hair. Extract 115 may extract these hair colors from within dataset 110 and enumerate them as a limited color palette within extracted schema 120. If query 130 specifies a search for people with green hair, then semantic analysis 150 may use the palette in extracted schema 120, that was derived from dataset 110, to detect and alert a value error.

3.0 Example Editor Process

Figure 2:
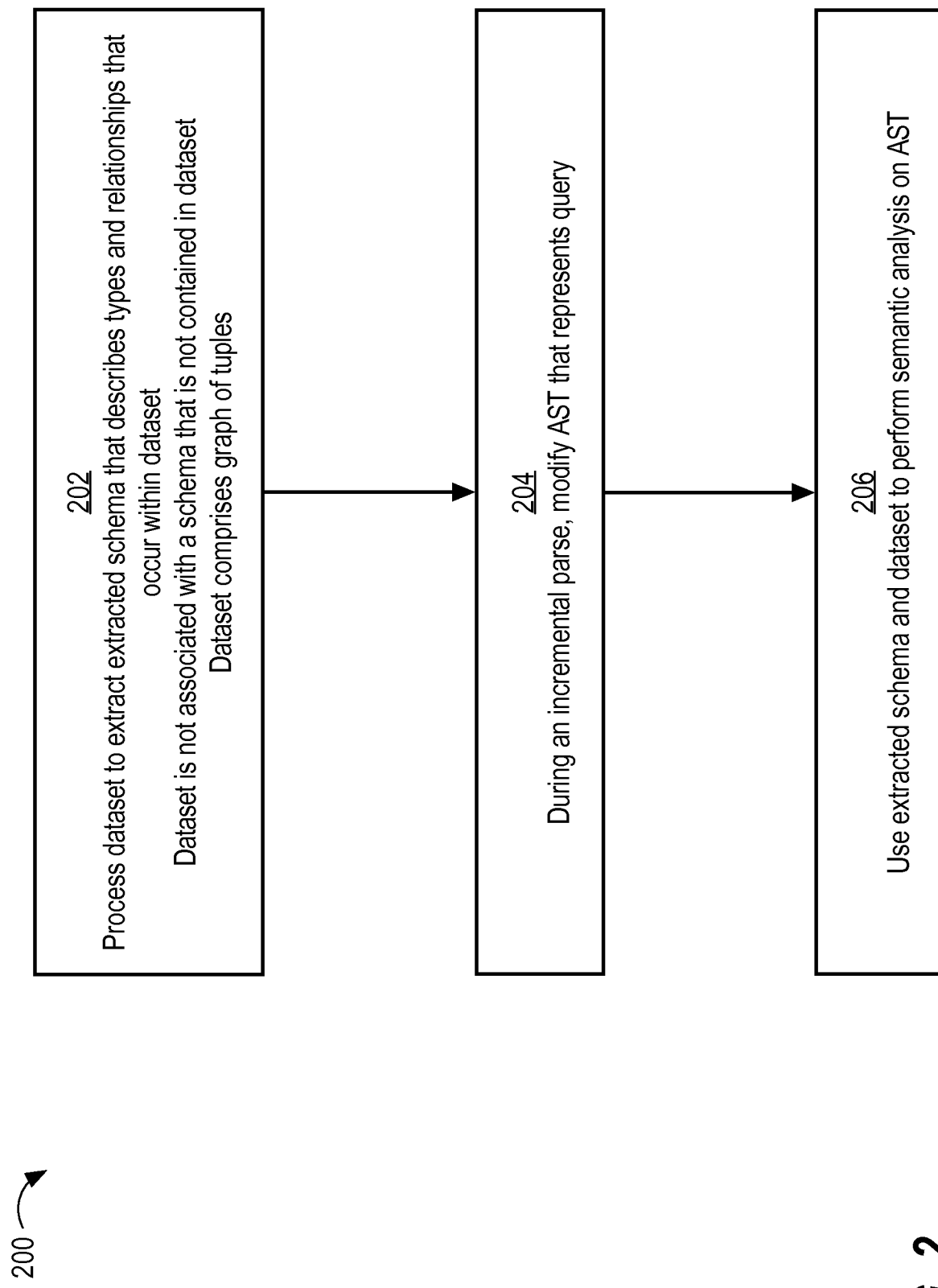
FIG. 2 illustrates an example process for achieving semantic analysis according to an embodiment.

FIG. 2 illustrates example editor process 200 that prepares for and performs semantic analysis according to an embodiment. For explanatory purposes, editor process 200 may be discussed with reference to FIG. 1.

In step 202, a schema is extracted from a dataset. For example, query editor system 100 connects to dataset 110. Connection may occur according to a file system interface, a network transport protocol such as hypertext transfer protocol (HTTP), or a structured interface such as open database connectivity (ODBC). Alternatively query editor system 100 may acquire dataset 110 by generation, manually entry, or synthesis from an original datasource that lacks tuples.

The mechanics of loading tuples from graph 112 depend on the implementation and the encoding of the tuples. For example, RDF tuples may be serialized as extensible markup language (XML), terse RDF triple language (Turtle), N-Triples or N-Quads, Notation 3 (N3), or JavaScript object notation for linked data (JSON-LD). Query editor system 100 may obtain dataset 110 directly from a graph database or a tuple store, such as a NoSQL database.

The operation of extract 115 may include a variety of techniques. Extract 115 may detect naturally recurring patterns within dataset 110 as a basis for formulating descriptive rules. Patterns may reveal value types, value ranges, data structures that aggregate attributes, and correlations between structures. If graph 112 is XML encoded, extract 115 may apply existing techniques of XML schema inferencing. Dataset 110 may have schematic tuples that extract 115 can digest, such as RDF schema statements.

In step 204, an AST that represents a query is modified during an incremental parse. For example, query 130 should conform to a grammar for which query editor system 100 has parsing machinery such as a lexer, a parser, or a parser framework. The lexer decomposes the text of query 130 into tokens. The tokens may be fit into the grammar by the parser according to grammatical production rules. The parser may generate an AST from scratch. In the case of an incremental parse, the AST of a prior parse may be reused and modified to reflect small changes made to query 130. An incremental parser retains the AST in memory for future use.

A syntax error can be detected and alerted during parsing. Semantic errors may linger undetected during this step. Some errors may be considered syntactic or semantic depending on the sophistication of the parser. For example, a dangling reference to a missing tuple from another tuple is a semantic error that is undetected by a context-free parser. However, a context-sensitive parser may detect this error as a syntactic error.

In step 206, semantic analysis occurs based on the AST, the dataset, and the extracted schema. Because semantic analysis 150 exploits rich sets of information, such as dataset 110 and extracted schema 120, semantic analysis 150 may detect errors that incremental parse 135 cannot.

Semantic analysis 150 provides a last opportunity to detect an error without actually executing query 130. Avoiding query execution during development helps in various ways. Semantic analysis may provide much faster feedback than query execution, which can accelerate an edit-debug cycle and conserve electricity that would have been spent on computationally expensive query execution. Without semantic analysis, some semantic errors may go undetected, fail silently or cryptically, or hang during query execution. In a production environment, avoiding unnecessary querying may protect throughput and stability for a wider audience.

Semantic analysis 150 also enables sophisticated automation such as code completion, an advanced form of text autocomplete that relies on automatic detection of content and context. Code completion boosts developer productivity by speeding text entry and increases quality by avoiding human errors. Because code completion leverages semantic analysis 150, a developer may use proposals made by code completion to attain insights regarding navigation of graph 112 while composing a query expression.

Code completion and alerting semantic errors are not the only features that semantic analysis 150 may enable. For example, query editor system 100 may follow semantic analysis 150 with compilation of query 130. Query compilation generates a compiled query. A compiled query is a low level query representation suitable for direct and efficient execution by a database. A compiled query specifies which fine grained operations the database must perform and in what order to accomplish query 130. A compiled query may be executed repeatedly without reparsing.

4.0 Semantic Analysis with RDF Triples Tore

Figure 3:
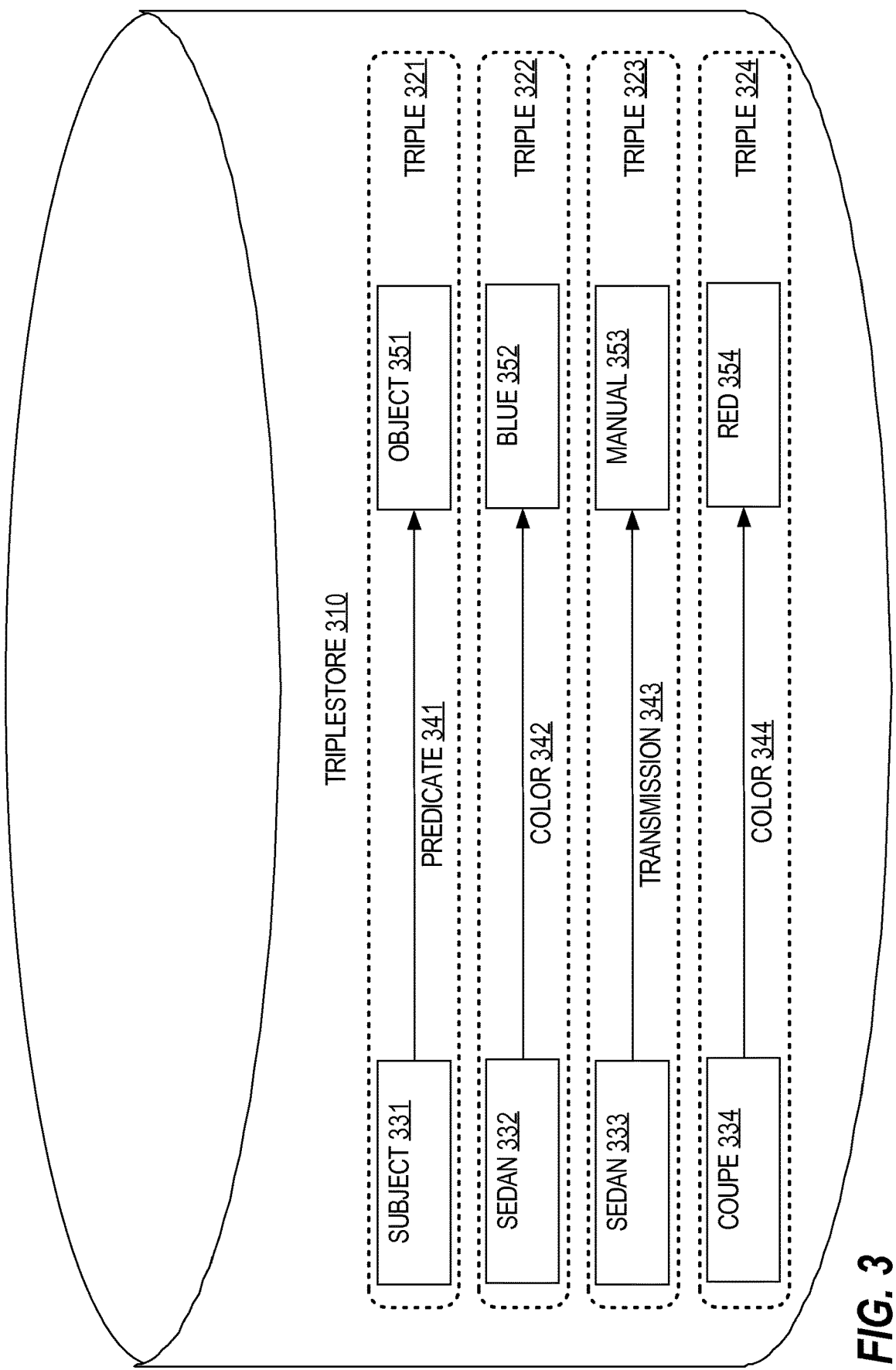
FIG. 3 is a logical block diagram illustrating an example triplestore in which certain techniques described herein may be implemented, according to various embodiments.

FIG. 3 illustrates a block diagram of triplestore 310, in which techniques described herein may be practiced. Triplestore 310 may be a dedicated triplestore, a tuple store such as a NoSQL database, a graph database, a relational database, a spreadsheet, an XML document, a flat file, or any other repository of a graph of tuples. In this example, the tuples are RDF triples. Triples have exactly three values. Triples are the standard tuple width for RDF. Triplestore 310 may contain a graph of many triples, of which only triples 321-324 are shown.

Triple 321 is an archetypal RDF triple that demonstrates a core pattern of RDF triples. An RDF triple is expected to convey knowledge in a format similar to that of a basic natural language sentence. An RDF triple has a subject, a predicate, and an object, always in that order. In triple 321 this appears as subject 331, predicate 341, and object 351. A predicate is a descriptor such, as an attribute or an action, that regards a subject. For example, sedan 332 and coupe 334 have a color attribute. An object of a triple specifies a particular value to satisfy a predicate, such as blue 352 or red 354.

The raw triples of triplestore 310, despite the absence of an existing schema, may be processed to generate an extracted schema. For example, subjects 332-333 are both sedans, which serve as instances from which a sedan type may be abstracted for inclusion in an extracted schema. Since various sedan triples specify either a color predicate or a transmission predicate, a sedan type in an extracted schema would have both of those predicates. After identifying all tuples of a type that is ready for abstraction, a schema extraction process may determine the union of all predicates of those tuples to determine the predicates of the type.

A similar strategy of determining the union of all instances of a predicate may derive a range of acceptable values, such as blue 352 and red 354, that actually appear as objects of triples having a particular predicate, such as a color predicate. Semantic analysis may detect and alert a query that uses the color predicate in conjunction with an object that is an invalid literal. An invalid literal may have the wrong type, such as a number, which cannot be a color.

A type mismatch may occur in the absence of a literal. For example, a query may attempt to compare the objects of two incompatible triples. Comparison of the objects of triples 322-323 is a type mismatch that semantic analysis may alert, because a blue 352 color 342 cannot be meaningfully compared with a manual 353 transmission 343.

An invalid literal may be properly typed but have a wrong value. For example if blue 352 and red 354 are the only colors that occur with the color predicate, and the extracted schema reflects this color limitation, then semantic analysis may detect and alert a literal for a color that is out of range, such as green.

4.1 Semantic Analysis with RDF Schema

Figure 4:
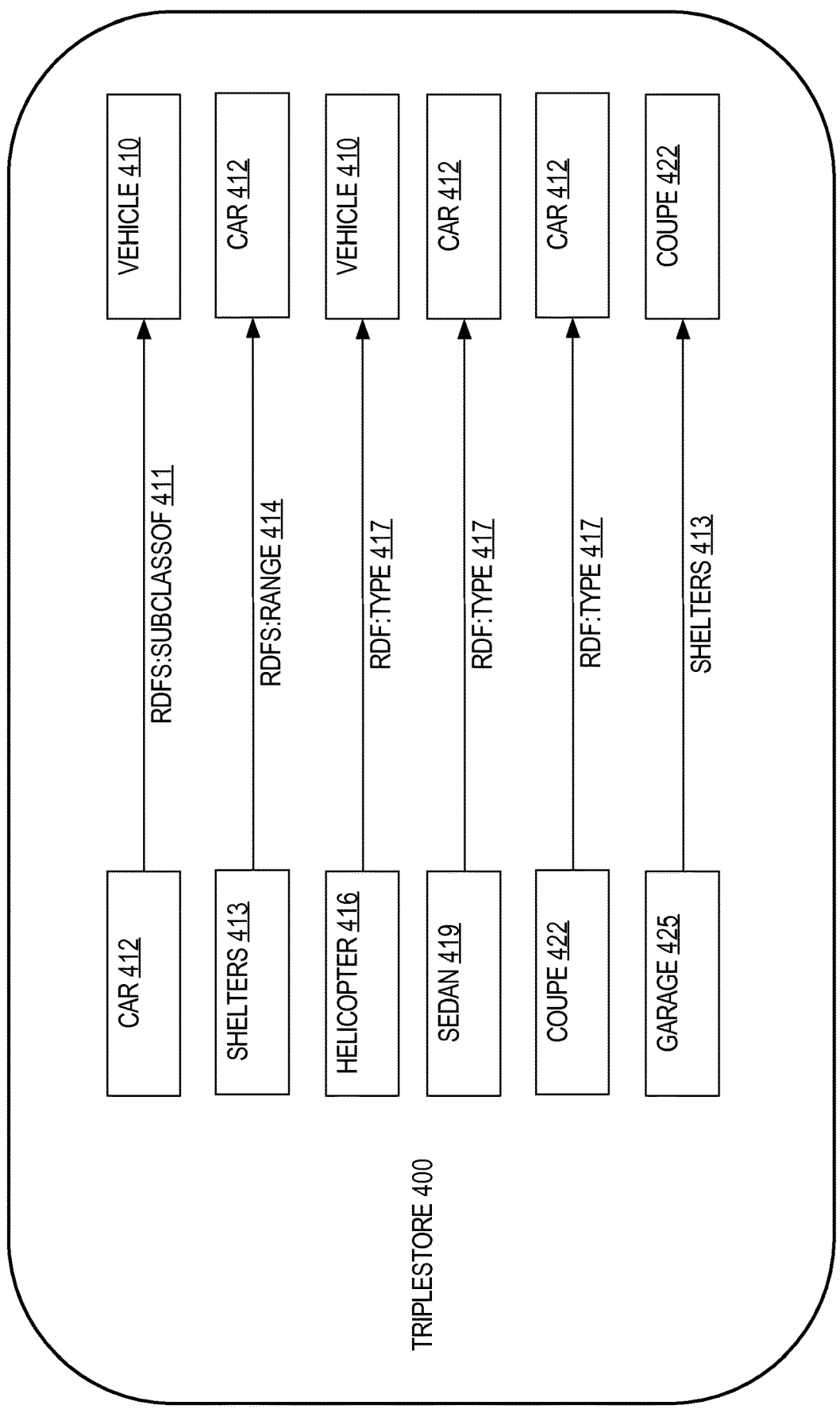
FIG. 4 is a logical block diagram illustrating an example triplestore in which certain techniques described herein may be implemented, according to various embodiments.

FIG. 4 illustrates a block diagram of triplestore 400, in which techniques described herein may be practiced. Triplestore 400 may be a dedicated triplestore, a tuple store such as a NoSQL database, a graph database, a relational database, a spreadsheet, an XML document, a flat file, or any other repository of a graph of RDF triples. Triplestore 400 may contain a graph of many triples, of which only some are shown.

Triplestore 400 contains custom triples that use standard RDF and RDF Schema predicates for data typing. These standard RDF predicates occur directly within a graph of triples. The rdf:type predicate enables a subject to be assigned a custom type, such as rdf:type 423 that declares coupe 422 to be an instance of car 412 type. Types can be arranged hierarchically for inheritance, such as rdfs:subclass of 411 that declares that car 412 is a subtype that inherits from vehicle 410. An RDF type may be either a primitive type, such as a number, or a class that specifies data aggregation and relations to other classes.

During schema extraction, a query editor system may digest standard RDF predicates to produce an extracted schema. Both the embedded RDF schema and the extracted schema specify which types are available and which predicates may be used with which types. For example, semantic analysis may alert a query that uses an unknown type or a predicate that is unavailable for the type of a subject.

Typing can be imposed on a custom predicate, such as rdfs:range 414 that declares the shelters 413 is a predicate that can only be used with an object of type car 412. Because garage 425 uses shelters 413 predicate, which restricts which objects are acceptable, a car may be sheltered in the garage, such as coupe 422, but a vehicle that is not a car cannot be sheltered, such as helicopter 416.

Figure 5:
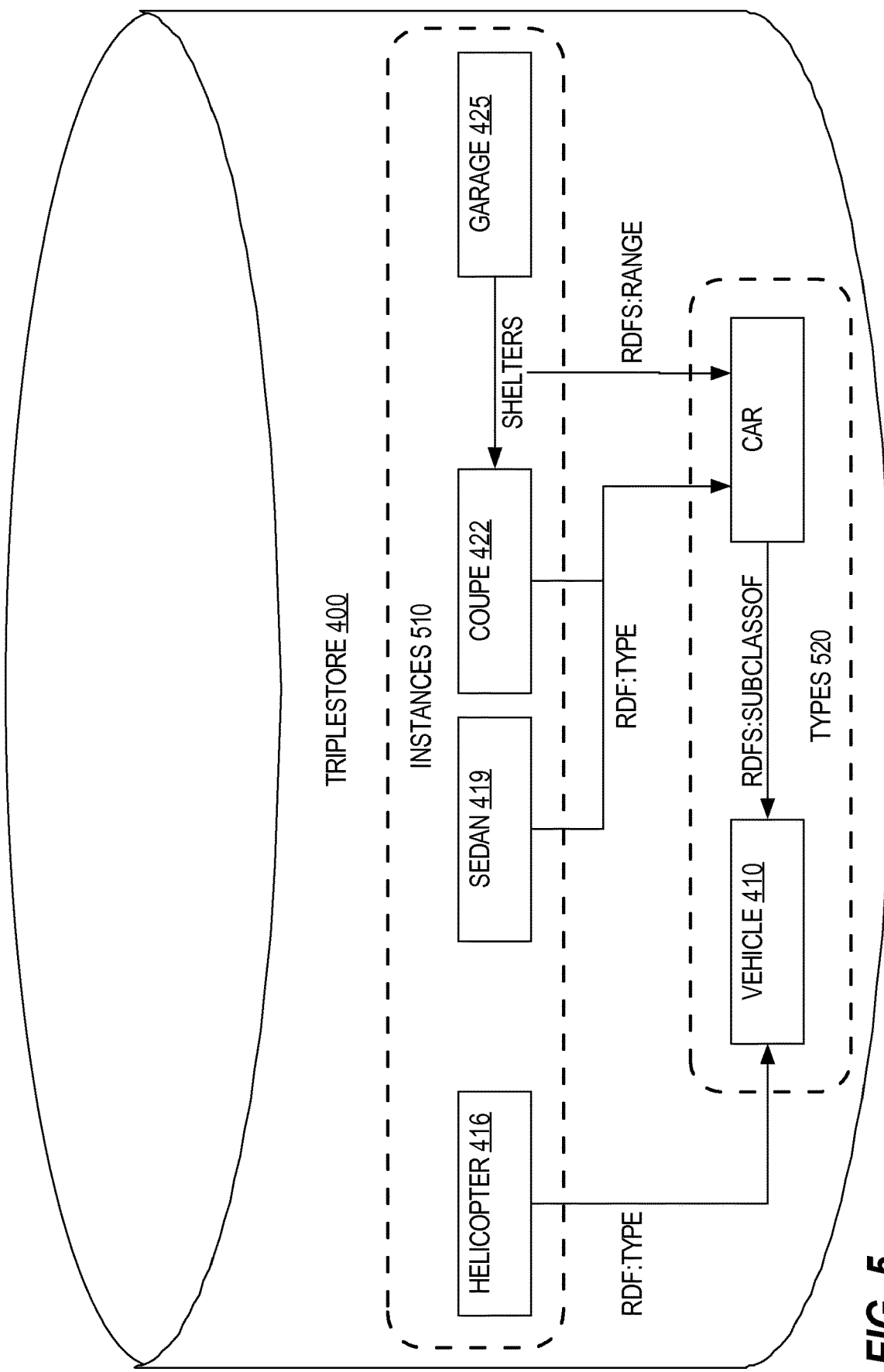
FIG. 5 is a logical block diagram illustrating an example triplestore in which certain techniques described herein may be implemented, according to various embodiments.

The triples of triplestore 400 in FIG. 4 are shown in FIG. 5 as a graph to further explain the schema. The graph nodes of FIG. 5 are the subjects of triples of FIG. 4. Connections between the nodes may be standard RDF schema predicates. Triplestore 400 includes instances 510 and types 520. Types 520 include triples that define classes and custom types. Instances 510 include triples that instantiate specific instances of those classes and custom types. An extracted schema may synthesize definitions based on both types 520 and instances 510. Schema extraction may directly import types 520. Schema information extracted from instances 510 supplements or refines the schema information of types 520.

4.2 Semantic Analysis with SPARQL

A query of triplestore 400 may be expressed in a semantic query language, such as SPARQL, that can traverse a tuple graph in meaningful ways. SPARQL is a query language for RDF. Semantic analysis may verify that a SPARQL query conforms to an extracted schema. Semantic analysis may enable code completion of a SPARQL query. SPARQL code completion may propose a completion of a subject, predicate, or object of a triple. SPARQL code completion may base its proposal on semantic analysis of any part of the triple. For example, semantic analysis of a predicate of a triple may be used to generate proposals for the subject or object of the triple.

Semantic analysis may alert violations of an extracted schema that is based on an RDF schema. Semantic analysis may alert a SPARQL query that has a value of an object of a triple that violates an rdfs:range of the predicate of the triple. Schema contraints of a class are imputed to subclasses of the class. Hence, semantic analysis of a SPARQL query may entail analysis of a class hierarchy, rather than only classes directly used in the query. For example, code completion may propose a predicate for a subject of a class based on a superclass of the class.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
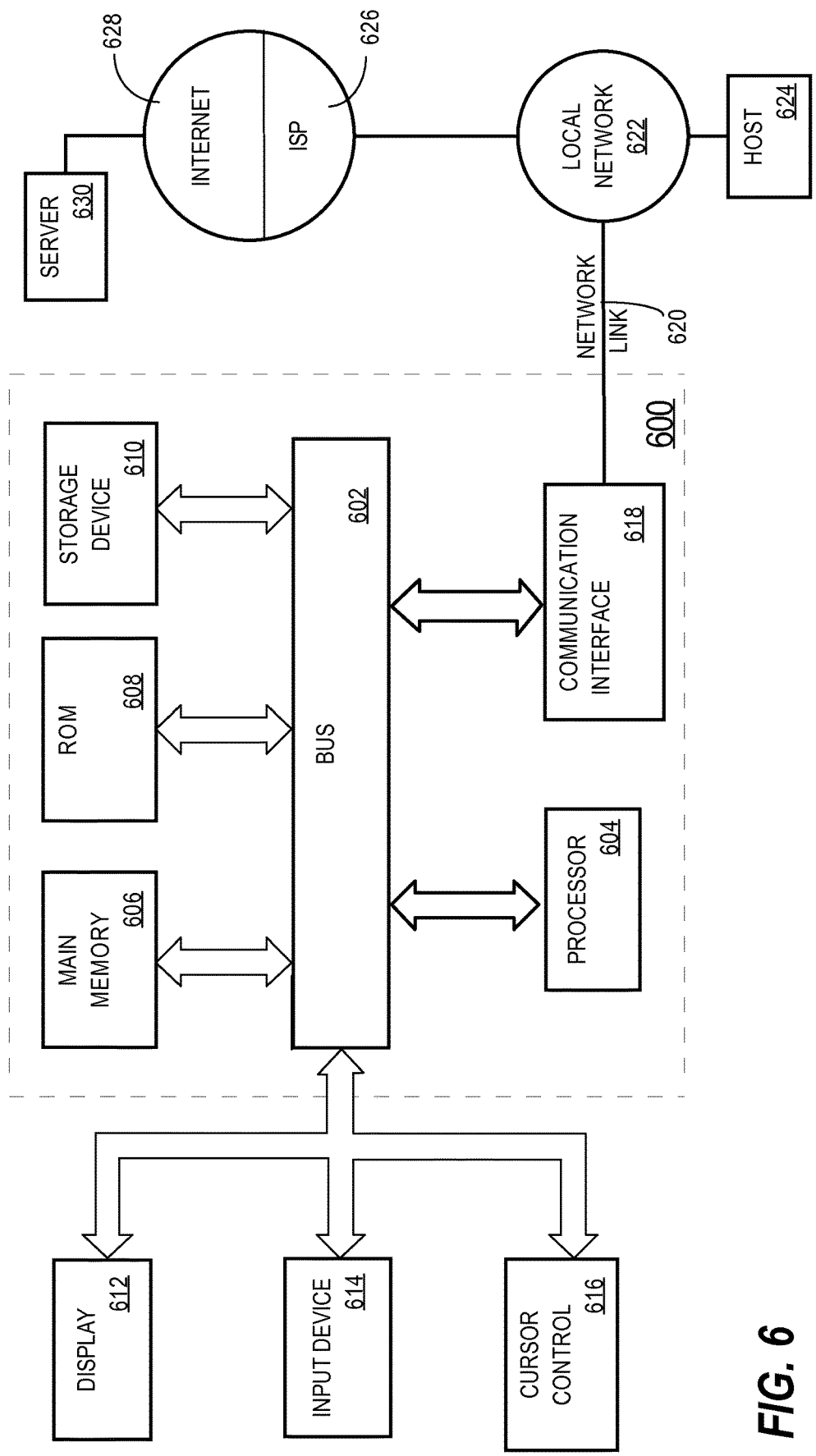
FIG. 6 is a block diagram illustrating one embodiment of a computer system suitable for implementing methods and features described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a light emitting diode (LED) display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   extracting or inferring, from a plurality of tuples, an extracted schema that describes types and relationships that occur within the plurality of tuples, wherein:
   a first tuple of the plurality of tuples encodes a single edge of a same graph,
   a second tuple of the plurality of tuples comprises a resource description framework (RDF) triple comprising a subject, a predicate, and an object,
   at least one tuple of the plurality of tuples comprises metadata that indicates a type of a component of the same graph, and
   the component is one of: an edge or a vertex;
   during an incremental parse, modifying an abstract syntax tree (AST) that represents a query;
   using the extracted schema and the plurality of tuples to perform semantic analysis on the AST;
   alerting, based on said semantic analysis on the AST that represents the query, that the query references a predicate that is unavailable for said subject of said RDF triple;
   wherein the method is performed by one or more computers.

2. The method of claim 1 further comprising generating a compiled query based on the AST.

3. The method of claim 1 wherein the query comprises a literal, wherein semantic analysis comprises alerting a data type error caused by use of the literal.

4. The method of claim 1 wherein the extracted schema comprises types of tuples.

5. The method of claim 4 wherein semantic analysis comprises alerting that the query references an unknown type.

6. The method of claim 4 wherein the plurality of tuples contains resource description framework (RDF) triples comprising a subject, a predicate, and an object.

7. The method of claim 6 wherein a type of tuples comprises an RDF class.

8. The method of claim 6 wherein:
the query is an invalid query;
semantic analysis comprises alerting that the invalid query references a predicate that is unavailable for said subject.

9. The method of claim 8 wherein semantic analysis further comprises discovering known predicates of RDF triples, wherein the RDF triples are not RDF schema statements.

10. The method of claim 6 wherein the RDF triples comprise RDF schema statements, wherein extract an extracted schema comprises processing the RDF schema statements.

11. The method of claim 6 wherein the query comprises a SPARQL query.

12. The method of claim 11 wherein the SPARQL query comprises an operator having two operands, wherein neither operand is a literal, wherein semantic analysis comprises alerting a data type error associated with at least one of the operands.

13. The method of claim 6 wherein the query comprises a uniform resource identifier (URI), wherein semantic analysis comprises alerting that the URI is not dereferenceable.

14. The method of claim 6 wherein semantic analysis comprises proposing a code completion of a predicate in the query, wherein the code completion depends on a subject of the predicate.

15. The method of claim 6 wherein semantic analysis comprises proposing a code completion of an object of a triple, wherein the code completion depends on a predicate of the triple.

16. The method of claim 6 wherein semantic analysis comprises alerting that an object of a triple of the query violates an RDF schema range statement.

17. The method of claim 6 wherein semantic analysis comprises proposing a code completion of one of: a predicate of a triple or an object of the triple, wherein the code completion depends on a type of a triple.

18. The method of claim 17 wherein the type is a first RDF class, wherein the code completion further depends on a second RDF class, wherein the first RDF class is a subclass of the second RDF class.

19. One or more non-transient computer readable media comprising instructions that, when executed by one or more processors, cause:
extracting or inferring, from a plurality of tuples, an extracted schema that describes types and relationships that occur within the plurality of tuples, wherein:
a first tuple of the plurality of tuples encodes a single edge of a same graph,
a second tuple of the plurality of tuples comprises a resource description framework (RDF) triple comprising a subject, a predicate, and an object,
at least one tuple of the plurality of tuples comprises metadata that indicates a type of a component of the same graph, and
the component is one of: an edge or a vertex;
during an incremental parse, modifying an abstract syntax tree (AST) that represents a query;
using the extracted schema and the plurality of tuples to perform semantic analysis on the AST;
alerting, based on said semantic analysis on the AST that represents the query, that the query references a predicate that is unavailable for said subject of said RDF triple.

20. The one or more non-transient computer readable media of claim 19 wherein the extracted schema comprises types of tuples; wherein the plurality of tuples contains RDF triples comprising a subject, a predicate, and an object; wherein semantic analysis comprises proposing a code completion, in the query, of one of: a predicate of a triple or an object of the triple, wherein the code completion depends on a type of a triple.

* * * * *